Oct. 23, 1928.

J. L. DRAKE 1,688,530

COOLER FOR SHEET GLASS APPARATUS

Filed Sept. 3, 1926

Inventor

John L Drake

By Frank Fraser

Attorney

Patented Oct. 23, 1928.

1,688,530

UNITED STATES PATENT OFFICE.

JOHN L. DRAKE, OF TOLEDO, OHIO, ASSIGNOR TO THE LIBBEY-OWENS SHEET GLASS COMPANY, OF TOLEDO, OHIO, A CORPORATION OF OHIO.

COOLER FOR SHEET-GLASS APPARATUS.

Application filed September 3, 1926. Serial No. 133,327.

The present invention relates to sheet glass drawing apparatus, and has more particular reference to heat absorbing means for absorbing heat from the glass before it is drawn into sheet form.

An important object of the invention is to provide heat absorbing means in the form of a cooler so constructed that it will have a uniform cooling action on molten glass from which a sheet may be drawn.

A further object of the invention is the provision of such an improved cooler wherein a cooling medium may be introduced thereinto from either or both ends thereof, and which cooling medium is discharged at the center of the cooler so that a continuous flow through said cooler may be had at all times.

A still further object of the invention is to provide such an improved cooler having associated therewith means whereby the cooling medium can be forced to either side of the cooler to increase the heat absorption at substantially a predetermined point above the glass, thereby securing a localized cooling effect.

Other objects and advantages of the invention will become more readily apparent during the course of the following description when taken in connection with the accompanying drawings.

Figure 1:
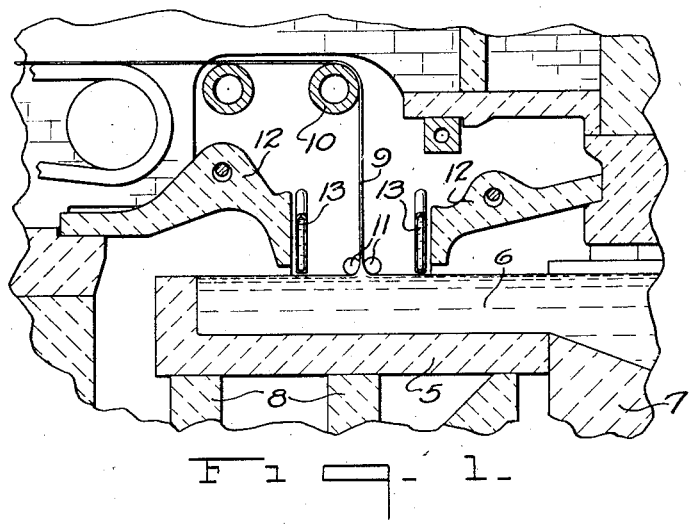
Figure 2:
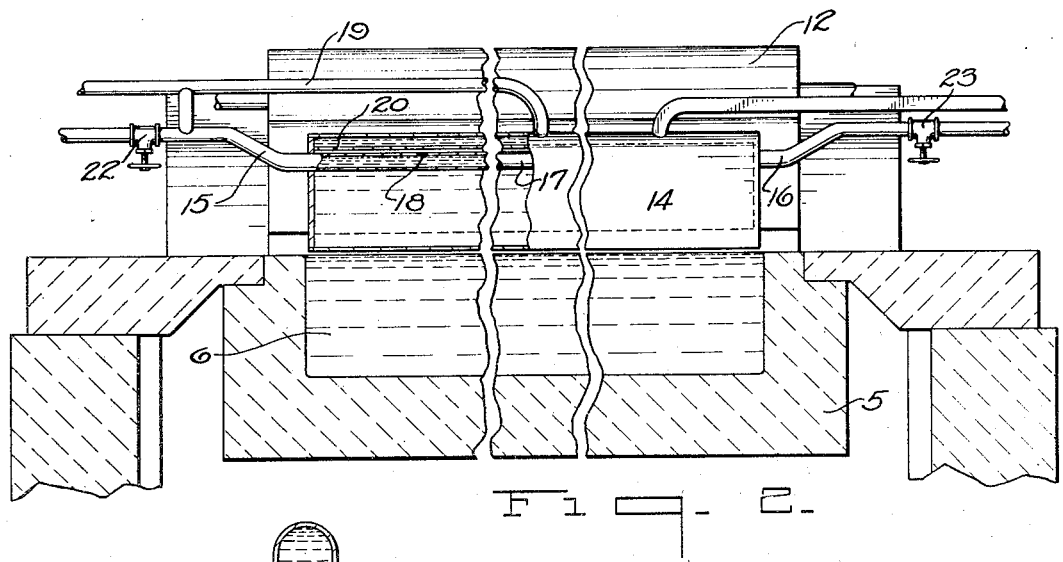
Figure 3:
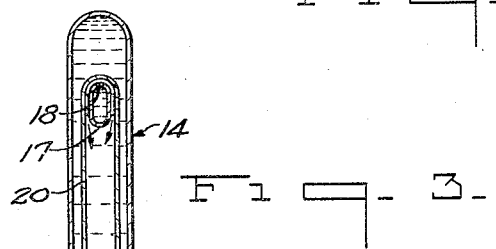

In the accompanying drawings forming a part of this application and wherein like characters of reference designate corresponding parts throughout the several views, Fig. 1 is a longitudinal vertical sectional view of a portion of sheet drawing apparatus showing associated therewith in cross section a pair of coolers constructed in accordance with the present invention, Fig. 2 is a transverse vertical section through Fig. 1, showing one of the coolers partially in section and partially in elevation, and Fig. 3 is an enlarged detail transverse sectional view of one of the coolers.

In the accompanying drawings, the numeral 5 designates a draw pot which may be formed from a refractory material and which is supplied with a source of molten glass 6 from any form of tank 7. The pot 5 is supported upon stools 8, and is also heated from the bottom by burners which are not shown. The sheet of glass 9 is drawn from the mass of molten glass 6 and is bent over a bending roll 10 to a horizontal plane, after which the sheet is passed through suitable flattening and annealing mechanisms. It is not essential that the sheet 9 be bent over a bending roll 10 to obtain the benefits of the present invention as this is merely one form of machine with which it may be used.

To maintain the sheet to width, knurled rollers 11, or similar means, are arranged at opposite sides of the sheet at both edges thereof, and are driven at a speed to enable a relatively heavy knurled edge to be formed on the sheet which is capable of holding the same to width. Arranged above the pot 5 are cover or lip tiles 12 which tend to force any heat currents present at that position downwardly toward the surface of the molten glass 6.

In the type of apparatus here shown which is more specifically set forth in the Colburn Patent No. 1,248,809, granted December 4, 1917, cooler members 13 are utilized to absorb heat from the surface of the glass before it is introduced into the sheet, and also to protect or shield the sheet 9 from heat currents from the tank. The coolers 13 are disposed relatively close to the surface of the molten glass from which the sheet is drawn and absorb sufficient heat to permit a good sheet of glass to be drawn.

With the form of coolers now in use, the cooling medium is introduced thereinto at one end only and is forced across the entire width of the pot containing the molten glass, after which it is discharged from the cooler. In this way it will be seen that the greatest heat absorption takes place as the cooling medium enters the cooler, and the amount of heat absorption gradually decreases across the width of the pot.

With the present form of cooler, the cooling medium is preferably introduced into the opposite ends of the cooler at the same time, and exhausted from the center thereof so that a more uniform cooling action on the glass may be obtained. Also, as will be more clearly hereinafter described, means is provided whereby the cooling medium can be forced to one side or the other of the cooler to increase heat absorption at substantially a predetermined point above the glass, whereby to secure a localized cooling effect thereon.

The coolers 13 are identical in construction so that a detailed description of only one of them is thought to be necessary. The cooler is preferably made of sheet metal and is designed to form a hollow elongated casing 14, which extends the entire width of the pot 5. The cooling medium is introduced into the opposite ends of the casing 14 through the ends 15 and 16 of the pipe 17, which pipe extends longitudinally within the said casing throughout the entire length thereof. The cooling medium enters the pipe 17 and passes outwardly thereof into the casing through any suitable number of apertures 18 formed in the top of the pipe 17. The cooling medium is subsequently discharged from the casing through an outlet pipe 19 positioned at the top of the casing intermediate the ends thereof.

To control the flow of the cooling medium escaping through the apertures 18, there is provided an inverted substantially U-shaped baffle 20, which is carried by, but spaced from, the pipe 17. It is to be noted that the apertures 18 are formed in the top of the pipe 17 so that the cooling medium is forced first upwardly and then downwardly within the casing. This is an essential feature of the present invention in that were the apertures at the bottom of the pipe the cooling medium would be forced directly downwardly against the bottom of the cooler which would result in a greater heat absorption at those points where the cooling medium would contact with the bottom of the casing.

In the operation of the cooler, the cooling medium is first introduced into the pipe 17 from the opposite ends thereof. The medium then passes upwardly through the apertures 18 into the space between the pipe 17 and baffle 20. The cooling medium will then follow the path of the arrows shown in Fig. 3, and pass around the pipe 17, then downwardly within the baffle 20, or in other words between the sides thereof. As the cooling medium becomes heated it will rise to the top of the casing, passing upwardly between the walls of the casing and the sides of the baffle 20, after which it will be discharged through the outlet pipe 19. It will thus be seen that, as the cooling medium is forced into the pipe 17 from both ends thereof and discharged from the casing at the center, there will be created a uniform heat absorption which has been found lacking in those types of coolers referred to hereinabove.

The ends 15 and 16 of the pipe 17 are provided with valves 22 and 23, and should it be desired for one reason or another to create a greater heat absorption at one side of the pot than at the opposite side, the opening of the valves 22 and 23 can be varied whereby to force the cooling medium to the desired side of the pot, thereby securing a localized cooling effect at a substantially predetermined point over the glass source 6.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a cooler, and means for introducing a cooling medium into the opposite ends thereof.

2. In sheet glass apparatus, a cooler, and means for introducing a cooling medium into either end thereof.

3. In sheet glass apparatus, a cooler, and means for introducing a cooling medium into either one or both ends thereof.

4. In sheet glass apparatus, a cooler, means for introducing a cooling medium into the opposite ends thereof, and means for permitting the discharge of the cooling medium from the cooler.

5. In sheet glass apparatus, a cooler, means for introducing a cooling medium into either one or both ends thereof, and means for permitting the discharge of the cooling medium from the cooler.

6. In sheet glass apparatus, a cooler, means for introducing a cooling medium into the cooler, and means for forcing the cooling medium to one side or the other of the cooler.

7. In sheet glass apparatus, a cooler, means for introducing a cooling medium into the opposite ends thereof, and means for controlling the cooling medium within the cooler.

8. In sheet glass apparatus, a cooler comprising a casing, means for introducing a cooling medium into the opposite ends of the casing, and means for forcing the cooling medium to either one end or the other of the casing.

9. In sheet glass apparatus, a cooler comprising an elongated casing, means for introducing a cooling medium into either one or both ends of the casing, means for controlling the flow of the medium in the casing, and means carried by the casing intermediate the ends thereof for permitting the discharge of the medium therefrom.

10. In sheet glass apparatus, a cooler comprising a casing, a supply pipe extending longitudinally within the casing and communicating therewith, means for forcing a cooling medium into either one or both ends of said pipe, and means for permitting the discharge of the medium from the casing.

Signed at Toledo, in the county of Lucas and State of Ohio, this 31st day of August, 1926.

JOHN L. DRAKE.